United States Patent
Ejzak

(10) Patent No.: US 7,366,514 B2
(45) Date of Patent: Apr. 29, 2008

(54) METHOD OF HANDING OFF A PACKET SWITCHED TO A CIRCUIT SWITCHED CALL

(75) Inventor: Richard Paul Ejzak, Wheaton, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 349 days.

(21) Appl. No.: 10/823,667

(22) Filed: Apr. 14, 2004

(65) Prior Publication Data

US 2005/0245261 A1 Nov. 3, 2005

(51) Int. Cl.
*H04Q 7/20* (2006.01)

(52) U.S. Cl. ............ 455/436; 370/230; 370/249; 370/359; 455/437; 455/465

(58) Field of Classification Search ......... 455/435.1–3, 455/437, 436, 432.1–3, 465; 370/230, 249, 370/353, 354, 355, 356, 359
See application file for complete search history.

(56) References Cited

U.S. PATENT DOCUMENTS

| | | | | |
|---|---|---|---|---|
| 6,377,804 B1* | 4/2002 | Lintulampi | ............. | 455/435.2 |
| 6,385,451 B1* | 5/2002 | Kalliokulju et al. | ........ | 455/437 |
| 6,424,638 B1* | 7/2002 | Ray et al. | .................... | 370/331 |
| 6,654,359 B1* | 11/2003 | La Porta et al. | ............ | 370/328 |
| 6,721,565 B1* | 4/2004 | Ejzak et al. | ................ | 455/436 |
| 6,725,036 B1* | 4/2004 | Faccin et al. | ............... | 455/433 |
| 6,771,964 B1* | 8/2004 | Einola et al. | ............... | 455/437 |
| 6,917,810 B2* | 7/2005 | Julka et al. | ................. | 455/439 |
| 6,963,745 B2* | 11/2005 | Singh et al. | ................ | 455/437 |
| 6,973,309 B1* | 12/2005 | Rygula et al. | .............. | 455/436 |
| 2002/0027891 A1* | 3/2002 | Mimura | ...................... | 370/331 |
| 2002/0067707 A1* | 6/2002 | Morales et al. | ............ | 370/331 |
| 2002/0110104 A1* | 8/2002 | Surdila et al. | ............. | 370/338 |
| 2003/0054822 A1* | 3/2003 | Core et al. | ................... | 455/436 |
| 2003/0157935 A1* | 8/2003 | Kauhanen | .................. | 455/436 |

\* cited by examiner

*Primary Examiner*—Lester G. Kincaid
*Assistant Examiner*—Diego Herrera

(57) ABSTRACT

By obtaining the address of a circuit switching controller in a network with which a mobile station is registered, a packet call controller instructs the circuit switching controller to send notification of when a handoff request is received for a mobile station by the circuit switching controller. The handoff request is for transferring a packet switched call to the circuit switching controller as a circuit switched call. The notification request includes an identifier, which the circuit switching controller uses in notifying the packet call controller of the handoff request. In response to the notification, the packet call controller re-establishes call control and bearer paths between the call endpoints.

21 Claims, 2 Drawing Sheets

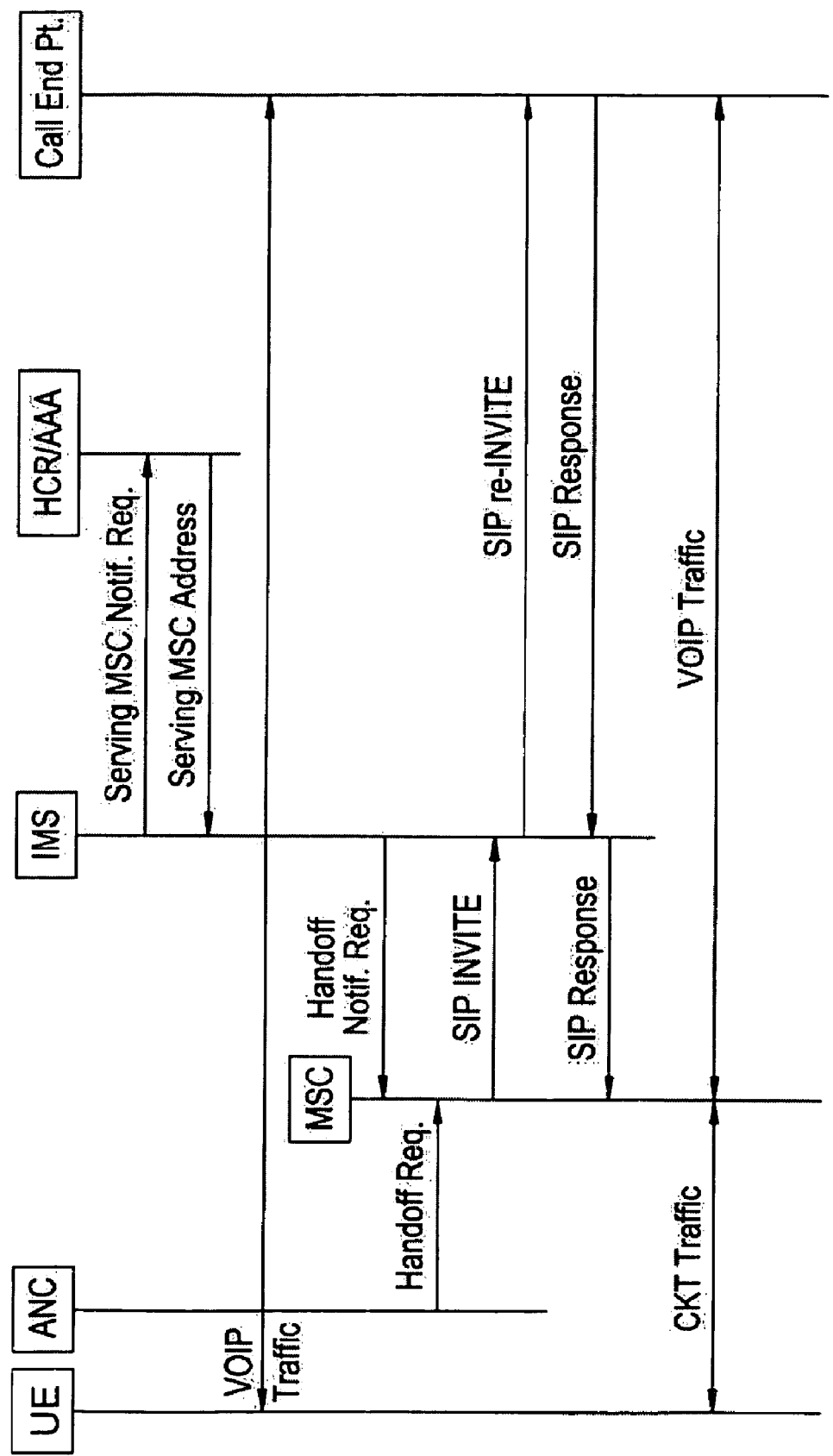

METHOD OF HANDING OFF A PACKET SWITCHED TO A CIRCUIT SWITCHED CALL

BACKGROUND OF THE INVENTION

1. Field the of the Invention

The present invention relates to telecommunication; and more particularly, methods for transferring packet switched communication to circuit switched.

2. Description of Related Art

When a mobile station moves within a wireless network, one communication station (e.g., base station, etc.) may transfer (e.g., according to well-known call handoff procedures) the communication needs of the mobile station to another communication station in the network. To the mobile station user, this transition is seamless in that the communication from and to the mobile station is substantially uninterrupted.

However, no mechanism currently exists for providing such a seamless transition when the mobile station moves from a network or portion of a network providing packet switched communication (e.g., Voice-over-IP or VoIP) to a different network or portion of a same network that cannot maintain a packet switched call, for example, due to unavailability of appropriate network resources for packet switch communication, but including appropriate resources for circuit switched. This situation is expected to be common during a transition period while packet switched systems with sufficient QoS support are being deployed but are not yet available ubiquitously. Currently, the packet switched call must be terminated, and a separate circuit switched call manually established on the second network. As a result, a significant gap in communication flow with the mobile station occurs. In some cases it may not even be possible to establish another call between the same parties from a circuit switched network, for example, when the end point in the packet switched network is not known by or associated with a telephone number.

SUMMARY OF THE INVENTION

The present invention provides methods of transferring a packet switched call carried over a first network to a circuit switched call carried over a second network.

In one exemplary embodiment, a packet call controller for packet switched calls obtains the address for a circuit switching controller in the second network with which a mobile station is registered. The mobile station may or may not currently be involved in a packet switched call. Using the obtained address, the packet call controller sends a handoff notification request to the circuit switching controller of the second network. The handoff notification request instructs the circuit switching controller to send a call transfer request to the packet call controller when a handoff request for a mobile station is received by the circuit switching controller. The call transfer request requests transfer of the packet switched call carried over the first network to a circuit switched call carried over the second network. In this embodiment, the handoff notification request may be sent before or after a packet switched call is established over the first network for the mobile station.

In one exemplary embodiment, the handoff notification request is an event request established using a SIP SUBSCRIBE request, and the call transfer request is a SIP INVITE request. In this embodiment, the handoff notification request includes a universal resource identifier (URI) associated with a call transfer function in the packet call controller for the mobile station. This URI is used as the Request URI in the SIP INVITE request.

When the packet call controller receives the call transfer request, the packet call controller sends a call control request to the end point communicating with the mobile station in the packet switched call. The call control request requests the end point to agree to transition the packet call controller from a call control agent for the first call control path from the first network to the end point to a call control agent for a second call control path from the second network to the end point. If the end point agrees, the packet call controller, as the call control agent, sets up a bearer path for the second call control path.

In one exemplary embodiment, the call control request is a SIP re-INVITE request.

The present invention provides for transferring a packet switched call to a circuit switched call without first terminating the packet switched call. As a result, the transition takes place quickly without requiring the user to manually re-establish the call. This invention has utility in any system that cannot maintain a packet switched call due to unavailability of appropriate network resources whereas circuit switched capability does exist.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein:

FIG. 2 illustrates a call flow diagram of call flow in the architecture of FIG. 1 according to an example embodiment of the present invention.

DETAILED DESCRIPTION OF EMBODIMENTS

Figure 1:
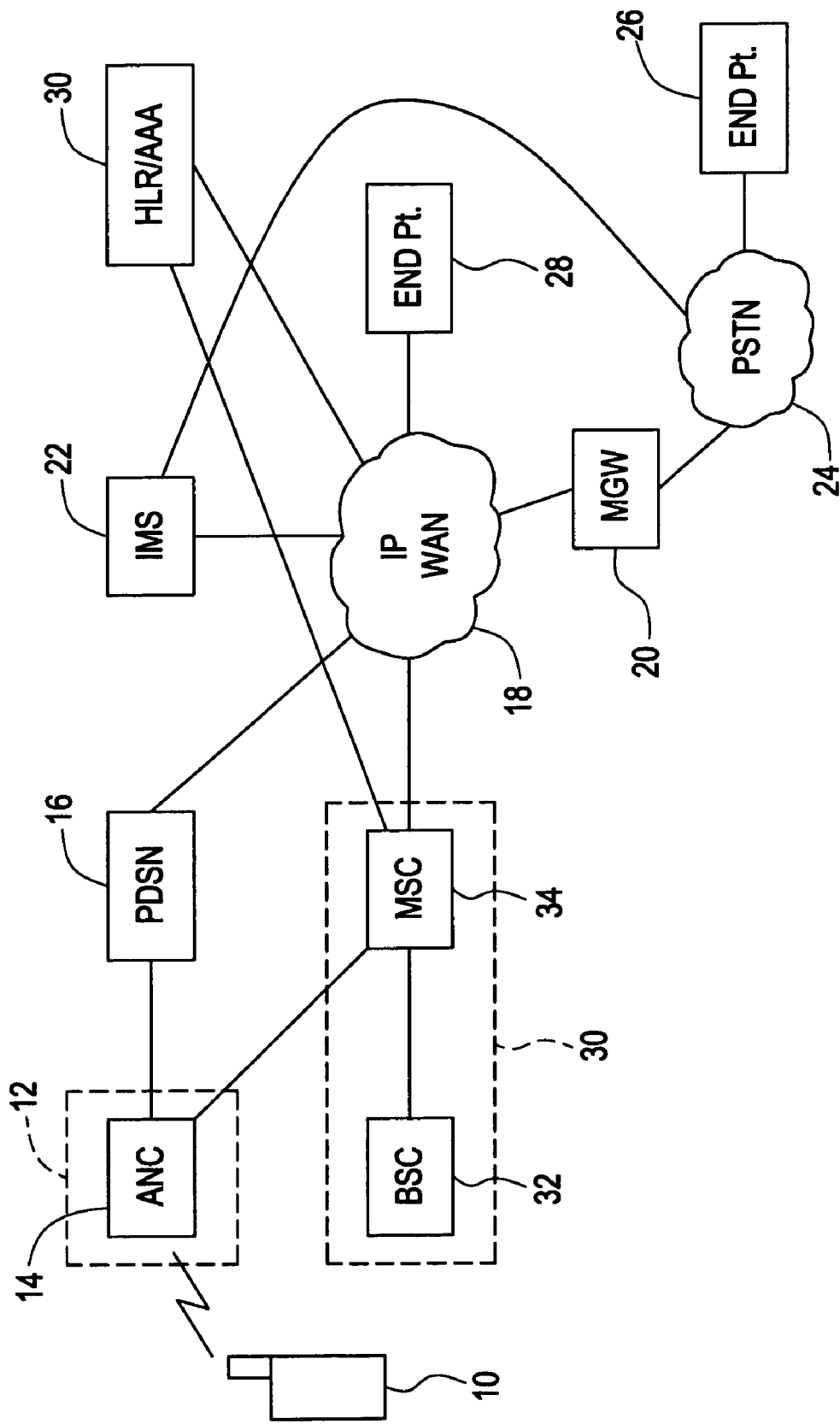
FIG. 1 illustrates a system architecture of a cdma2000 3G1X-EVDO network and a cdma2000 3G1X-EVDV network and their relationship with a packet call controller (e.g., an IP multimedia subsystem (IMS) as shown)

For purposes of explanation only, the embodiments of the present invention will use the example of handing off a packet switched call (e.g., a Voice-over-IP or VoIP call) carried over a cdma2000 3G1X-EVDO based network (hereinafter the DO network) to circuit switched call carried over a cdma2000 3G1X-EVDV based network (hereinafter the DV network).

FIG. 1 illustrates a system architecture of a cdma2000 3G1X-EVDO network and a cdma2000 3G1X-EVDV network and their relationship with a packet call controller (e.g., an IP multimedia subsystem (IMS) as shown). As shown, a mobile station or user equipment (UE) 10 communicates with a high rate packet data (HRPD) access network controller (ANC) 14 in a DO network 12. The terms mobile station and user equipment will be used interchangeably and generically throughout this application as any device (phone, PDA, computer, etc.) capable of wireless communication, and should not be interpreted as limited to a particular standard. The mobile station 10 supports the air interface signaling for both the DO network 12 and the DV network 30 (discussed below), and supports the ability to switch between a stable VoIP call state to a stable circuit voice call state. Also, as will be appreciated, a DO network 12 includes many more aspects than the HRPD ANC 14; however, for purposes of clarity, these other elements have not been shown.

The HRPD ANC 14 sends the VoIP bearer traffic received from the mobile station 10 to a packet data serving node (PDSN) 16. The PDSN 16 routes the VoIP traffic to an end point 28 over an IP wide area network (WAN) 18. The end point 28 may be a computer connected to the internet, a VoIP phone directly connected to the IP WAN 18, another mobile station connected to the IP WAN 18 in the same or similar manner that mobile station 10 is connected, etc. Alternatively, the VoIP bearer traffic is routed to a media gateway (MGW) 20. The MGW 20 converts the VoIP bearer traffic to a suitable communication format for a public switched telephone network (PTSN), and routes the converted voice call over a PSTN 24. The PSTN 24 connects the call to an end point 26 such as a telephone connected to the PSTN 24. For purposes of explanation only, the VoIP session will be described as being between the mobile station 10 and the end point 28. The call control path between the mobile station 10 and the end point 28 traverses the HRPD ANC 14, the PDSN 16, the IP WAN 18, and the IMS 22. The call control path between the mobile station 10 and the end point 26 traverses the HRPD ANC 14, the PDSN 16, the IP WAN 18, the IMS 22, and the PSTN 24. The HRPD ANC 14, the PDSN 16, and the IP WAN 18 support transport of IP packets with the appropriate quality of service (QoS) and do not otherwise influence signaling messages on the call control path or bearer traffic on the bearer path.

The routing within the IP WAN 18 is managed by a packet call controller such as a IP multimedia subsystem (IMS) 22 as defined in 3GPP TS 23.228 and related specifications, and shown in FIG. 1. According to an embodiment of the present invention, the IMS 22 serves as a proxy for the SIP signaling related to the VoIP session between the mobile station 10 and the end point 28. Throughout this disclosure, examples of SIP signaling are according to the well-known SIP protocol version 2.0, defined in IETF RFC 3261 and related specifications.

FIG. 1 further shows a DV network 30 and associated connections with the architecture described above. As shown, the DV network 30, like the DO network 14, includes a network controller—a base station controller (BSC) 32 that may provide communication services to the mobile station 10. A BSC is the DV network counterpart to an ANC in a DO network. The BSC 32 provides for routing circuit switched call traffic to a circuit switching controller—a mobile switching center (MSC) 34. Because a DO network does not provide circuit switched communication, no counterpart to the MSC exists in a DO network. The MSC 34 manages operation of the BSC 32, and also provides for routing circuit switched traffic from the BSC 32 to the IP WAN 18 by performing interworking between circuit switched call control signaling and bearer traffic within the DV network 30, and interworking between the VoIP call control signaling and VoIP bearer traffic within the IMS 22 and IP WAN 18. The MSC 34 has IP interfaces for SIP signaling and voice media with the IP WAN 18 and the IMS 22, and supports a handoff notification procedure as described in detail below.

The home location register & authentication, authorization and accounting server (HLR/AAA) 30 shown in FIG. 1, also known as a home subscriber server (HSS), is the repository of subscriber-related data such as defined in the 3GPP or 3GPP2 standards. In addition to the well-known HLR/AAA procedures, the HLR/AAA 30 supports a serving MSC address notification procedure as described in detail below.

Next, an embodiment of the method according to the present invention will be described with respect to the architecture of FIG. 1 and the call flow diagram illustrated in FIG. 2. A UE 10 registers, in the conventional manner, with the DO network 12, the PDSN 16 and the IMS 22 (not shown). Afterwards, a VoIP call over the DO network 12 may be established in the conventional manner between the UE 10 and the end point 28. During the VoIP call, a call control agent function of the IMS 22 serves as a session-stateful proxy for the SIP signaling related to the VoIP session between the mobile station 10 and the end point 28. In this capacity, the IMS 22 accumulates information regarding the VoIP session such as identification of the end point, identification of the mobile station, etc.

Furthermore, as shown in FIG. 2, after registration with the IMS and, in this embodiment, before the VoIP call is established, the IMS 22 sends a serving MSC address notification request to the HLR/AAA 30. FIG. 2 only shows the relevant information exchanged during the serving MSC notification request procedure and other procedures, and does not precisely depict all of the actual messages, since the other individual procedures occur in the conventional manner. While FIG. 2 shows this serving MSC address notification request being sent prior to the VoIP call being established, it will be appreciated that the serving MSC address notification request may be sent after the VoIP call is established. As is known, even if the DV network 30 is not currently serving a UE 10, the UE 10 may register with an MSC 34 in the DV network 30 at any time prior to the DV network receiving a handoff request for the mobile station 10, and may also register before the VoIP call is established. This registration information is provided to the HLR/AAA 30. The HLR/AAA 30, in the known manner, stores this registration information along with the address or location of the MSC 34 that forwarded the registration information. The serving MSC address notification request according to one example embodiment is a SIP SUBSCRIBE request sent according to a SIP SUBSCRIBE method or procedure (e.g., such as set forth in SIP Version 2.0 as defined in IETF RFC 3261, IETF RFC 3265, and related specifications) with an event package that requires the HLR/AAA 30 to notify or inform the IMS 22 of the address for the MSC in the DV network 30 with which the UE 10 is currently registered (referred to as the "serving MSC"). Furthermore, according to this procedure the HLR/AAA 30 sends a notification of the new serving MSC address when the serving MSC changes. It will be appreciated that the SIP SUBSCRIBE method with this serving MSC address notification event package or procedure is but one example of how the IMS 22 may obtain the address or location of the serving MSC. For example, alternate protocols and procedures such as a Diameter protocol query/response may be used.

As shown in FIG. 2, the HLR/AAA 30 keeps the IMS 22 up-to-date on the address of the serving MSC in the DV network 30. The IMS 22 uses this address to send a handoff notification request to the serving MSC for the mobile station 10. While not shown in FIG. 2, each time the IMS 22 receives the serving MSC information indicating a new serving MSC, the IMS 22 sends a handoff notification request for the mobile station 10 to the new serving MSC. In the example embodiment shown in FIG. 2, the handoff notification request is only sent after the VoIP call on the DO network 12 has been established. This is done to avoid maintaining unnecessary state information at the MSC when no VoIP session is active. However, it will be appreciated that the present invention is not limited to this example. Instead, the handoff notification request may be sent after receiving a new serving MSC address and before a VoIP call is established on the DO network 12 for the UE 10. Furthermore, the handoff request is shown as being sent from the ANC 14 to the MSC 34. However, the handoff request may be sent from the ANC 14 to the BSC 32 in the manner disclosed in U.S. application No. unknown, entitled METHOD OF TRANSFERRING CALL TRANSITION MESSAGES BETWEEN NETWORK CONTROLLERS OF DIFFERENT RADIO TECHNOLOGIES, filed Apr. 14, 2004 by inventors of the subject application, the entire contents of which are hereby incorporated by reference.

The handoff notification request according to one example embodiment is a SIP SUBSCRIBE request sent according to a SIP SUBSCRIBE method or procedure (e.g., such as set forth in SIP Version 2.0 as defined in IETF RFC 3261, IETF RFC 3265, and related specifications) with an event package that requires the MSC receiving the request to notify or inform the IMS 22 of when the MSC 34 receives a handoff request for the UE 10. As will be appreciated, the handoff notification request identifies the mobile station that is the subject of the request (e.g., using a mobile station identifier provided by the mobile station during registration). Also, according to this procedure, the IMS 22 provides the serving MSC 34 with a network address for addressing a call transfer function for the mobile station 10 in the IMS 22. As will be appreciated, the IMS 22 may be comprised of one or more servers with various functional modules operating thereon. For each mobile station 10 registered with the IMS 22, a respective call transfer function is established. Each call transfer function has a network address or identifier; this identifier, according to the SIP protocol, is a universal resource identifier (URI).

Furthermore, the handoff notification procedure at the MSC requires, as shown in FIG. 2, that the MSC 34 generate a SIP INVITE request when a handoff is performed for the UE 10. As is known, a SIP INVITE request may be used as a form of call request to establish communication between two parties. According to the handoff notification procedure, the SIP INVITE request includes the URI provided in the handoff notification request as the Request URI in the SIP INVITE request. As a result, the SIP INVITE request is routed to the call transfer function at the IMS 22 for the UE 10.

FIG. 2 shows a handoff request sent by the ANC 14 to the MSC 34. The ANC 14 generates the handoff request according to any well-known handoff technique. When the MSC 34 processes at least some portion of the handoff request, the MSC 34 sends a SIP INVITE request as a call transfer request to the IMS 22.

Upon receipt of the SIP INVITE request, the IMS 22 functionally recognizes the request as a call transfer request, and sends a SIP re-INVITE request to the end point 28. As will be appreciated, because the call control agent within the IMS 22 served as the proxy for SIP signaling in the VoIP call between the UE 10 and the end point 28, the IMS 22 knows to direct the SIP re-INVITE request to the end point 28. Functionally, the SIP re-INVITE request serves to change the role of the IMS 22 with respect to the SIP signaling between the UE 10 and the end point 28. The SIP re-INVITE request requests the end point to agree to transition the IMS 22 from a call control agent (e.g., proxy server) for the call control path from the DO network 12 to a call control agent (e.g., back-to-back user agent) for a call control path from the DV network 30 to the end point 28. The call control agent (i.e., IMS 22), using back-to-back user agent procedures according to IETF RFC 3261, may establish this new call control path by using a target refresh request towards the end point 28 to take over as a call control agent for the mobile station 10 while responding directly to the INVITE request from the MSC 34 to act as the call control agent for the end point 28 towards the MSC 34. Thus the call transfer function in the IMS 22 acts as call control agent for both remaining portions of the new call control path while interworking the call control procedures between these two portions of the new call control path. The initial call control path from the DO network 12 no longer exists. The initial packet switched call between UE 10 and end point 28 transitions to a circuit switched call within the DV network 30 after the handoff event. The DV network 30 and IMS 22 continue to support the exchange of voice media between the UE 10 and end point 28 after the handoff event to the DV network 30 until either party terminates the call using standard call termination procedures. When the call transfer function receives call control signaling indicating that one portion of the new call control path is terminated, it will also terminate the remaining portion of the new call control path.

FIG. 2 illustrates the end point 28 responding to the SIP re-INVITE request according to known SIP procedures. As the call control agent for a call control path from the DV network 30 to the end point 28, the IMS 22 establishes a bearer path from the MSC 34 to the end point 28 over the IP WAN 18 that does not traverse through the IMS 22 according to well-known third party call control procedures for establishing such a bearer path. The MSC interworks the circuit switched call control signaling established between the UE 10 and the MSC 34 with the SIP call control signaling established among the MSC 34, the IMS 22, and the end point 28. The MSC 34 interworks the circuit voice bearer traffic established between the UE 10 and the MSC 34 with the VoIP bearer traffic established between the MSC 34 and the end point 28.

While the present invention has been described using the example of a DO network as the packet switched network and the DV network as an example of the circuit switched network, the present invention is not limited to these two example networks. Instead, the present invention is applicable to any network supporting packet switched calls such as an 802.11 network, etc., and/or any network supporting circuit switched calls such as a 3GPP GSM or 3GPP UMTS. As such, the packet switched network and the circuit switched network may be two different radio networks or parts of the same network where the two parts support different degrees of IP quality of service (QoS). Accordingly, as used through this application and the claims, the term network covers different networks or different network portions of a same network.

The present invention provides for transferring a packet switched call to a circuit switched call without first terminating the packet switched call. As a result, the transition takes place quickly without requiring the user to manually re-establish the call. This invention has utility in any system that cannot maintain a packet switched call due to unavailability of appropriate network resources whereas circuit switched capability does exist. This situation is expected to be common during a transition period while packet switched systems with sufficient QoS support are being deployed but are not yet available ubiquitously.

The invention being thus described, it will be obvious that the same may be varied in many ways. Such variations are not to be regarded as a departure from the spirit and scope of the invention, and all such modifications as would be obvious to one skilled in the art are intended to be included within the scope of the present invention.

I claim:

1. A method of transferring a packet switched call carried over a first network to a circuit switched call carried over a second network, comprising:
   receiving a handoff notification request from a packet call controller at a network controller of the second network, the handoff notification request instructing the network controller to send a call transfer request to the packet call controller when a handoff request for a mobile station is received by the network controller, the call transfer request requesting transfer from a packet switched call carried over the first network to a circuit switched call over the second network;
   receiving a serving controller notification request to a location register, the serving controller notification request requesting notification of a circuit switching controller in the second network with which the mobile station is registered at least when a change in circuit switching controller registration takes place;
   sending at least one serving controller notification indicating the circuit switching controller with which the mobile station is registered; and
   wherein the receiving step receives the handoff notification request from the indicated circuit switching controller.

2. The method of claim 1, wherein the handoff notification request is an event request established using a SIP SUBSCRIBE request.

3. The method of claim 1, further comprising:
   sending the call transfer request upon receipt of a handoff request for the mobile station.

4. The method of claim 1, wherein the first and second networks are one of different networks and different portions of a same network.

5. The method of claim 1, wherein the call transfer request is a call request including an identifier identifying the call request as a call transfer request.

6. The method of claim 5, wherein the handoff notification request includes a network address for addressing a call transfer function for the mobile station in the packet call controller, and the identifier is the network address.

7. The method of claim 5, wherein the identifier is a universal resource identifier.

8. The method of claim 5, wherein the call request is a SIP INVITE request.

9. The method of claim 8, wherein the identifier is a Request URI provided for use in call transfer of the mobile station by the handoff notification request.

10. A method of transferring a packet switched call carried over a first technology based network to a circuit switched call carried over a second technology based network, the packet switched call being between a mobile station and an end point, comprising:
    sending a handoff notification request to the second technology network, the handoff notification request requesting that the second technology network send notification when the second technology network receives a handoff request for the mobile station;
    sending a serving controller notification request to a location register, the serving controller notification request requesting notification of a circuit switching controller in the second network with which the mobile station is registered at least when a change in circuit switching controller registration takes place;
    receiving at least one serving controller notification indicating the circuit switching controller with which the mobile station is registered; and
    wherein the sending step sends the handoff notification request to the indicated circuit switching controller.

11. The method of claim 10, wherein the notification is a call request including an identifier identifying the call request as a call transfer request.

12. The method of claim 11, wherein the handoff notification request includes a network address for addressing a call transfer function for the mobile station in the packet call controller, and the identifier is the network address.

13. The method of claim 11, wherein the identifier is a universal resource identifier.

14. The method of claim 11, wherein the call request is a SIP INVITE request.

15. The method of claim 14, wherein the identifier is a Request URI provided for the mobile station by the handoff notification request.

16. The method of claim 10, further comprising:
    establishing a bearer path between the end point and the mobile station via the second network when the notification is received.

17. The method of claim 16, wherein the establishing step comprises:
    sending a call control request to the end point requesting agreement to transition the packet call controller from a call control agent for a first call control path from the first network to the end point to a call control agent for a second call control path from the second network to the end point.

18. The method of claim 17, wherein the establishing step further comprises: setting up the bearer path at the packet call controller as the call control agent for the second call control path.

19. The method of claim 17, wherein the control request is a SIP re-INVITE request.

20. The method of claim 10, wherein the handoff notification request is a SIP INVITE request.

21. The method of claim 10, wherein the first and second networks are one of different networks and different portions of a same network.

* * * * *